United States Patent Office 3,347,884
Patented Oct. 17, 1967

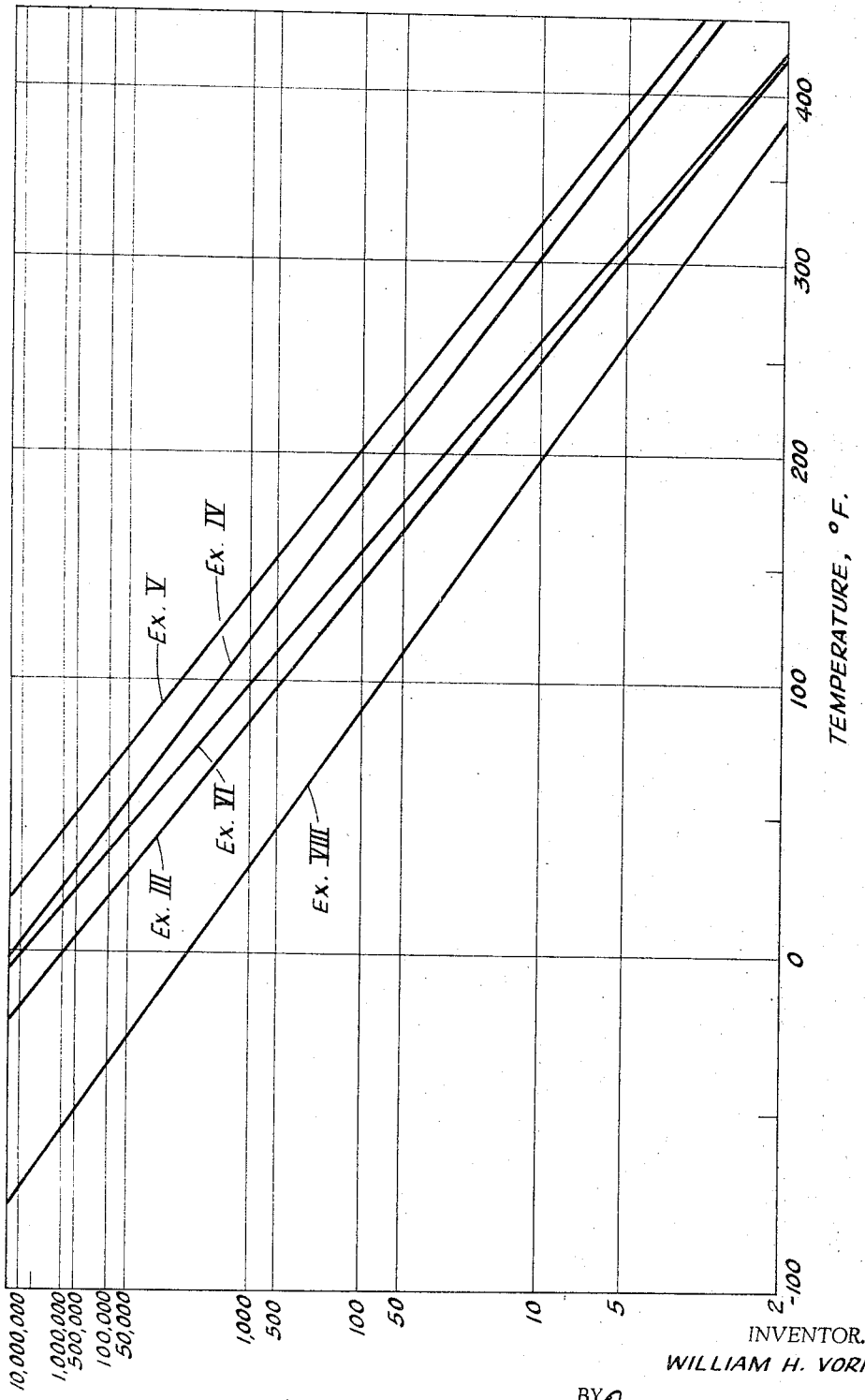

3,347,884
ESTERS OF 2,3',4-TRIHYDROXYDIPHENYL
William H. Voris, Mars, Pa., assignor to Koppers Company, Inc., a corporation of Delaware
Filed Sept. 17, 1964, Ser. No. 397,155
15 Claims. (Cl. 260—410.5)

ABSTRACT OF THE DISCLOSURE

Synthetic lubricants are provided which are the alkanoyl esters of resorcinol still residue. Resorcinol still residue contains as its main ingredient, 2,3',4-trihydroxydiphenyl. The alkanoyl esters of resorcinol still residue, and specifically of 2,3',4-trihydroxydiphenyl, have been found to have excellent properties making them suitable for use as synthetic lubricants.

---

This invention relates generally to synthetic lubricants. Gas turbine and jet engines have brought into the field of lubrication entirely new requirements, as to operating temperature and the like that cannot be met by the mineral oils which, for years, had provided satisfactory lubrication for piston engines. Troubles were experienced with attempts to use the mineral oils due, for example, to coking, high evaporative loss, and inadequate load-carrying capacity. These new requirements have led to the need for synthetic lubricants.

It has now been discovered that the ester of resorcinol still residue is a good synthetic lubricant.

Resorcinol still residue is the black, tarry, resinous material which remains as a residue after the technical grade resorcinol has been removed, as a distillate, from the reaction mass that is produced in the manufacture of resorcinol by the fusion of sodium meta-benzene disulfonate with caustic soda. The resorcinol still residue comprises from 5–30% by weight of the reaction mass.

The resorcinol still residue is a mixture of high molecular weight compounds. The compounds that is found in predominate amount is isomeric trihydroxydiphenyl with small amounts of dihydroxydiphenyls. The compound occurring in the greatest known amount is 2,3',4-trihydroxydiphenyl

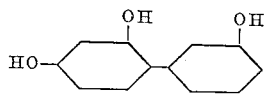

The dihydroxydiphenyl is usually the 3,4' isomer.

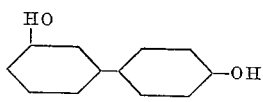

The disposal of this resorcinol still residue has become a problem due to the great production of resorcinol because of its widespread use in the production of dyestuffs, pharmaceuticals, plasticizers, textiles, rubbers, resins and adhesives. Numerous attempts have been made to discover uses for this residue. Patent No. 2,753,312, for example, describes the production of molded separators for storage batteries using resorcinol still residue. Patent No. 3,133,-033 describes the use of resorcinol still residue for the production of joint sealers.

Quite surprisingly, it has now been discovered that the alkanoate of resorcinol still residue is an excellent lubricant.

The novel compounds of resorcinol still residue are made by esterifying the resorcinol still residue with an alkanoic acid having from 2 to 20 carbon atoms thereon.

The resorcinol still residue may be used as it comes from the still. Because of the close production controls in the manufacture of resorcinol, the resorcinol still residue varies but little in its properties and qualities from batch to batch. It is preferred, however, the subject the resorcinol still residue to a further distillation, for example, by using a Rodney-Hunt evaporator and use the resulting overhead. This distillate is about 40% by weight of the original residue. The distillate is a yellow, tacky solid having cold flow properties. The solid contains about 23% hydroxyl (analyzed by acetylation). It has been found that this distillate analyzes from 6–12% of resorcinol, from 30–50% of 2,3',4-trihydroxydiphenyl, 5–10% 3,4'-dihydroxydiphenyl, and the remainder is comprised mainly of other polyhydroxy isomers.

The esterification of either the crude or the overhead of resorcinol still residue may be carried out in a conventional manner, for example, by reacting the resorcinol still residue with the alkanoyl chloride. The resorcinol still residue furthermore can be partially or completely esterified. It is preferably to use the neo acids for the esterification because the neo acid (2,2-dimethyl alkanoic) esters of the polyhydroxyldiphenyls have good oxidative and thermal stability. This characteristic is believed to be due to the absence of tertiary hydrogen atoms on the carbon atom alpha to the carboxyl group of the neo acid structure. The resulting ester is predominately

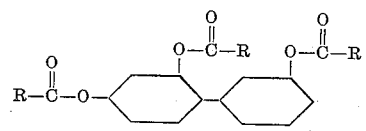

where R may be the same or different alkyl groups having from 1–20 carbon atoms. If desired, less than complete esterification may take place.

The invention will be illustrated further by the following examples.

Example 1

Pivalic acid (250 g., 2.45 moles) was charged to a one liter, three-necked flask equipped with a stirrer, thermometer, reflux condenser and dropping funnel. Thionyl chloride (574 g., 482 moles) was then added through the dropping funnel over a period of one hour while the reaction mass was stirred and heated to maintain it at a temperature of 20–32° C. Thereafter, the temperature of the mass was maintained at 20–40° C. and the stirring was continued for a period of 6½ hours. Then, the temperature of the reaction mass was raised over a period of 2 hours to reflux at 89° C. The product was fractionally distilled to yield 235 g. (80% of theory) pivaloyl chloride, B. 103–105° C. at atmospheric pressure.

Resorcinol still residue was subjected to vacuum distillation in a Rodney-Hunt evaporator until 40% by weight of the material had been removed as overhead. This overhead of resorcinol still residue (60.2 g., 0.8 eq.), toluene (324 ml.), and dimethyl formamide (6 ml.) were charged to a one liter, three-necked flask equipped with a stirrer, thermometer, reflux condenser, and dropping funnel. The liquid was heated to 84° C. and pivaloyl chloride (106 g., 0.88 eq.) added over a period of 15 minutes while the reaction mass was stirred and maintained at a temperature of 84–70° C. Thereafter, heating of the reaction mass was then continued for 5¼ hours while the temperature was maintained at 70–80° C. The mass was cooled to 20° C., and 60 ml. pyridine was added. The heating was again continued for 4½ hours with the temperature at about 106° C. The reaction mass was then cooled.

The reaction solution was washed six times with 60 ml. of 12.5% HCl each time, then seven times with 120 ml. of 20% KOH each time and finally five times with 140 ml. of water each time. The final water wash was neutral to pH paper.

Toluene was removed from the reaction mass by vacuum distillation. Then the distillation was continued until the temperature of the residue reached 203° C. at 3.5 mm. Hg. Only a few drops of distillate with a camphor-like odor appeared, identified by I.R. and nuclear magnetic resonance (NMR) to contain N,N-dimethylneopentanamide. The tripivalate of resorcinol still residue which remained as the residue (66.01 g., 51.7% yield) was a dark brown liquid whose viscosity was such that it barely flowed at room temperature.

*Example II*

The overhead from resorcinol still residue obtained as in Example I was dissolved in an equal weight of aqueous 5% sodium hydroxide solution at 40° C. This crystallized out of the solution upon standing. The crystals were recrystallized from an 8.4% aqueous sodium hydroxide solution which had been treated with "Celite" filter and and "Darco" activated carbon to decolorize the solution to yield by weight 72% of a purified product. Infrared and gas chromatographic analyses indicated that this purified overhead of resorcinol still residue (M.P. 129–133° C.) consisted of about 90% 2,3',4-trihydroxydiphenyl, 9% of an unidentified component, and a small amount of a third component which was postulated to be 4,3'-dihydroxydiphenyl. An aliquot of the product so purified (19.1 g., 0.94 mole), xylene (100 ml.), and dimethyl formamide (2 ml.) were charged to a 300 ml. three-necked flask equipped with stirrer, thermometer, dropping funnel, and reflux condenser. The mixture was heated to 120° C. and pivaloyl chloride (39 g., 0.32 mole) was then added through the dropping funnel over a period of 20 minutes while the reaction mass was stirred and maintained at a temperature of 100–120° C. Thereafter, heating of the mass was continued for another hour with the temperature being maintained at 100–120° C. The solution was then cooled to 35° C. and 20 ml. pyridine was added. The reaction mass was again heated and the temperature kept at 100–110° C. for 2 hours. Then the mass was cooled to room temperature.

The reaction mass was washed in a separatory funnel five times with portions (45 ml. each time) of 50/50 conc. HCl/H₂O, then four times with portions (75 ml. each time) of 20% aqueous sodium hydroxide, and finally seven times (50 ml. each time) with water in seven portions. The final wash water was neutral to pH paper.

The xylene was distilled from the reaction mass by vacuum distillation and the residue heated to a temperature of 145° C. at the subatmospheric pressure of 1–2 mm. Hg. The resorcinol still residue tripivalate was obtained in 97.6% yield (41.9 g.) as a slightly cloudy, yellow, glassy solid which becomes a viscous fluid at 45–50° C.

*Example III*

Neoheptanoic (2,2'-dimethylpentanoic) acid (520 g., 4.0 moles) was charged to a three liter, four-necked flask. Thionyl chloride (769 g., 6.4 moles) was added over a period of 70 minutes while the solution was being stirred and maintained at a temperature of 30–40° C. The temperature of the reaction mass was then raised over a period of 2¼ hours to reflux at about 75° C. and maintained at 65–70° C. for 8 hours. Fractional distillation of the crude product yielded 488 g. (82% of theory) neoheptanoyl chloride, B. 147–152° C. at atmospheric pressure.

The overhead from resorcinol still residue as obtained in Example I (22.6% OH, 75.2 eq. wt.) (89.2 g., 1.19 eqs.), xylene (410 ml.) and dimethyl formamide (8 ml.) were charged to a one liter, three-necked flask equipped with a dropping funnel, thermometer, a reflux condenser and stirrer. The mixture was heated to 70° C. and neoheptanoyl chloride (196 g., 1.32 eqs.) added through the dropping funnel over a period of 35 minutes as the mass was being stirred and its temperature was being maintained at 70–90° C. Then the reaction mass was maintained at a temperature of 90–121° C. for 5 hours. Thereafter, the mass was cooled to room temperature and 80 ml. of pyridine was added. The reaction mass was heated and the temperature kept at 100–120° C. for 2 hours. The mass was then cooled to room temperature.

The reaction mass was washed in a separatory funnel with four successive portions, 190 ml. each, of 12.5% HCl, and then eight times with 125 ml. each time of 20% KOH and finally four times with 175 ml. portions of water. The final wash was neutral to pH paper.

The xylene was removed by vacuum distillation. The distillation was continued and 5.7 g. (3%) of a colorless, very fluid distillate with a camphor-like odor was obtained at a final pot temperature of 210° C. at the subatmospheric pressure of 5 mm. Hg. This distillate was identified by I.R. and NMR as consisting mostly of N,N-dimethylneoheptanamide. The trineoheptanoate residue (201 g., 91.8% yield) was a dark, transparent, viscous oil. (Resorcinol still residue trineoheptanoate.)

A quantity (85.2 grams) of the trineoheptanoate was dissolved in 500 ml. acetone and was stirred with 10 g. "Darco" activated carbon for ten minutes. The mixture was then filtered through Whatman No. 42 filter paper. This treatment with "Darco" carbon was repeated, the carbon filter cakes were extracted with 50 ml. acetone, and the combined acetone solution evaporated on the steam bath to a pot temperature of 100° C. at 2 mm. Hg. Trineoheptanoate of a light yellow color was recovered in an amount of 83.5 g., or 98% of the charged crude product.

Another series of experiments was conducted in which the crude trineoheptanoate was dissolved respectively in benzene and in ether and activated carbon was added afterwards. Such treatments changed the color of the trineoheptanoate from the original dark brown to a pale yellow. Acetone and ether appeared to be equally effective and both were slightly better than benzene as the solvent to provide a product with the best color.

*Example IV*

Resorcinol still residue (20.1% OH, eq. wt. 84.5) (84.5 g., 1.0 eq.), xylene (410 ml.), and dimethyl formamide (6 ml.) were charged to a one liter three-necked flask. The mixture was heated to 94° C. and neoheptanoyl chloride (163.5 g., 1.1 eqs.) then added through a dropping funnel over a 30-minute period while the liquid was stirred and its temperature was maintained at 94–100° C. The temperature was then raised to 131° C. and there maintained for 1½ hours. The mass was allowed to cool overnight and pyridine (90 ml.) was added. The material was again heated and the temperature maintained at 90–124° C. for three hours. The material was cooled to room temperature. The xylene solution was washed portions, and thereafter with 900 ml. water in five portions, then with 1200 ml. of 20% KOH in twelve equal portions, and thereafter with 900 ml. water in five portions. The final wash was neutral to pH paper.

The xylene was removed from the mass by vacuum distillation. The temperature was increased and 2.4 g. (2%) of the colorless distillate with a camphor-like odor was collected at a maximum pot temperature of 120–206° C. (max.) and a subatmospheric pressure of 1.5 mm. Hg. The trineoheptanoate residue (141 g. of 71.5% yield) was a clear, brown, viscous, liquid.

A 50.3 g., quantity of trineoheptanoate residue was dissolved with heat in 500 ml. acetone. Then 10 g. activated carbon was stirred with the solution for 10 minutes, and the mixture filtered through Whatman No. 42 filter paper. The filtrate was a deep red solution. Another treatment of the filtrate was made with activated carbon, and the color of the solution changed to a dark red. After four more repeat treatments with activated carbon, the color changed to a light red; the last treatment, however, resulted in little change in color. The filter cakes were washed with 50 ml. portions of acetone and the combined acetone solution evaporated to a pot temperature of 100° C. at 3 mm. Hg. The resorcinol still residue trineoheptanoate had an amber color, and amounted to 41.5 g., or 83% of the crude product.

*Example V*

Neotridecanoic acid (689 g., 3.1 eq. wts.) was charged to a two-liter, 3-necked flask equipped with a stirrer, dropping funnel, thermometer, and reflux condenser. Thionyl chloride (786 g., 6.6 moles) was added through the dropping funnel over a period of 2¾ hours while the mass was being stirred and maintained at a temperature of 32–40° C. The temperature of the reaction mass was then raised over a 2 hour period to reflux at about 80° C. and was maintained at 79–87° C. for 12 hours longer. Excess thionyl chloride was removed by distillation under a 10-inch Vigreaux column at atmospheric pressure. The crude product was then distilled at reduced pressure to yield 483 g. (64.6% of theory) neotridecanoyl chloride, B. 138–144° C. at 24–26 mm. Hg (distillation being discontinued because of bumping). A residue of 258 g. (34.6% of theory for neotridecanoyl chloride) remained.

The overhead of resorcinol still desidue obtained as in Example I (75.2 g., 1.0 eq.), toluene (400 ml.), and dimethylformamide (15 ml.) were charged to a one liter three-necked flask. The mixture was heated to 86° C. and neotridecanoyl chloride (229 g., 0.96 eg.) added through a dropping funnel over a 30-minute period while the mass was being stirred and was being maintained at this temperature. Heating was continued for 2¼ hours more keeping the temperature at 87–110° C. An immiscible dark red liquid formed which rimmed the flask wall at the liquid surface. The mixture was cooled to 25° C. overnight and pyridine (85 ml.) then added. The mass was heated to a temperature of 110° C. over a period of an hour and the temperature was kept at 110–113° C. for 4.3 hours more. The mass was cooled to room temperature.

The dark solid on the bottom of the flask was insoluble in the 600 ml. of 12.5% HCl used in three portions to wash the reaction mixture. Washing with 750 ml. of 20% KOH in seven portions dissolved the solid phase; very dark emulsions formed at first. Water washing with 800 ml. in seven portions provided a final wash neutral to pH paper.

Toluene was removed by vacuum distillation. The distillation was continued and 6.0 g. (3%) of yellow, oily distillate was collected by heating the still pot to a final temperature of 200° C. at about 1 mm. Hg. The trineotridecanoate residue (209 g., 88% yield) was a dark brown, transparent, viscous liquid (resorcinol still residue trineotridecanoate).

*Example VI*

The overhead from resorcinol still residue obtained as in Example I (65.4 g., 0.87 eq.) xylene (410 ml.), and dimethyl formamide (6 ml.) were charged to a one liter three-necked flask. The mixture was heated to 100° C. and pivaloyl chloride (34.7 g., 0.29 eq.) was added through a dropping funnel over a period of ten minutes while the mass was stirred and the temperature kept at 100–160° C. Stirring was continued for 3⅓ hours as the temperature was maintained at 103–111° C. The mass was cooled overnight. (A 15 ml., 3.6% sample of the yellow upper phase analyzed 8.5 wt. percent OH or 77.5% of theory for resorcinol still residue monopivalate).

The reaction mixture was heated to 106° C. over a period of one hour and neoheptanoyl chloride (94.8 g., 0.64 eq.) was added over a period of 20 minutes at this temperature. The temperature was raised to 110° C. and kept at 110–120° C. for another 3 hours. The mass was cooled to room temperature. Pyridine (80 ml.) was added, and the temperature raised to 113° C. within ½ hour and kept at 113° C. for 2 hours. Then the mass was cooled to room temperature.

The reaction mass was washed successively with five portions, 110 ml. each, of 12.5% HCl, then with six portions, 130 ml. each of 20% KOH and then with six portions, 200 ml. each, of water until the final wash was neutral to pH paper.

Xylene was removed from the mass by vacuum distillation. The temperature was raised and 4.5 g. (4%) of a colorless distillate with a camphor-like odor was collected at a final residue temperature of 206° C. and pressure of 1.4 mm. Hg. The "monopivalate-dineoheptanoate" residue (115 g., 74% yield) was a brown, clear, viscous liquid. The monopivalate-dineoheptanoate of resorcinol still residue had good lubricating properties.

*Example VII*

The overhead product from resorcinol still residue, such as in Example I, (36.6 g., 0.5 eq.) and 200 cc. of toluene were heated to 70° C. in a three-necked flask equipped with a thermometer, stirrer, dropping funnel, and reflux condenser. Over a period of an hour, there was added through a dropping funnel heptanoyl chloride (82 g., 0.55 eq.). The temperature of the reaction mass was then raised to 81° C. and was maintained between 80–90° C. for a period of 2½ hours. The reaction mass was cooled to room temperature, and 40 milliliter of pyridine was added. The material was then heated to 90–110° C. and held there for a period of 2½ hours. The reaction mass was then washed with dilute hydrochloric acid, then with dilute sodium hydroxide, and finally with water until the wash had a neutral pH as determined by pH paper. Thereafter, the toluene was vacuum distilled from the reaction mass and the vecuum was increased until a subatmospheric pressure of one millimeter of mercury and a residue temperature of 220° C. was reached. The residue which remained was a clear, amber liquid. IR analysis revealed it to be the triheptanoic ester of the overhead of resorcinol still residue.

The properties of the products from Examples III through VII above are tabulated below:

TABLE 1

| | Viscosity, cs. | | ASTM Slope | Viscosity Index | 13,000 cs. T., ° F. | Pour Point T., ° F. | Thermal Stability TGA, T., ° F. | | | Refractive Index |
|---|---|---|---|---|---|---|---|---|---|---|
| | 100° F. | 210° F. | | | | | 10% | 50% | 100% | |
| Ex. III | 455 | 18.4 | 0.80 | 8 | 44 | 20 | 518 | 630 | -------- | 1.5050 |
| Ex. IV | 2,180 | 47 | 0.75 | 28 | 70 | 35 | 550 | 667 | 752 | 1.5075 |
| Ex. V | 7,276 | 77 | 0.79 | -------- | 92 | 48 | -------- | -------- | -------- | 1.5012 |
| Ex. VI | 908 | 23 | 0.84 | -------- | 58 | 20 | -------- | -------- | -------- | 1.5068 |
| Ex. VII | 66 | 8.4 | 0.70 | 106 | -12 | -45 | 549 | 653 | 707 | 1.5082 |

*Example VIII*

The overhead from resorcinol still residue obtained as in Example I (226 grams, 3.0 eq.) and xylene (1.312 milliliters) were charged to a three-necked flask. The mixture was heated to 70° C. and neoheptanyl chloride (297 grams, 2.0 eq.) was added over a period of 45 minutes while the reaction medium was stirred and maintained at a temperature of 70–90° C. The temperature was then maintained within the range of 90–121° C. for 25 hours to assure complete reaction. The solution was cooled to room temperature and 128 milliliters of pyridine was added. The mass was again heated to a temperature of 100–121° C. and there maintained for two hours. The mass was cooled to room temperature, placed in a separatory funnel and washed four times with 200 milliliter portions of 12½% hydrochloric acid solution, then eight times with 200 milliliters each time of 20% potassium hydroxide and finally with four portions, (400 milliliters each) of water. The final wash was neutral to pH paper. The xylene was removed from the mass by vacuum distillation. The distillation temperature was then increased to where the residue temperature was 257° C. at the subatmospheric pressure of 1.2 millimeters of mercury. The product was a viscous yellow oil. Infrared analyses indicated the product to be dineoheptanoate of the overhead product from the resorcinol still residue.

An important characteristic, of course, of lubricants is the viscosity and the relationship of viscosity to temperature. The single sheet of drawing illustrates this relationship by way of a conventional A.S.T.M. Standard Viscosity-Temperature Chart.

Another important characteristic of fluids, of course, is their lubricity. Accordingly, the products of Example III and Example IV, as set out below were tested in a conventional Shell Four-Ball Wear Tester under test conditions which included operating for one hour at a temperature of 167° F. and a speed of 620 revolutions per minute with 52–100 steel bearings under loads of 1 kilogram, 10 kilograms, and 40 kilograms.

The results of the product with and without an additive (0.5 weight percent diisopropyl phosphite) are compared below with a standard ester lubricant di-2-ethylhexyl sebacate.

TABLE 2

| Fluid | Average Wear Scar Diameter, mm. | | |
|---|---|---|---|
| | 1 kg. | 10 kg. | 40 kg. |
| Ex. III | 0.19 | 0.27 | 1.05 |
| Plus Additive | | | 0.40 |
| Ex. IV | 0.20 | 0.22 | 0.82 |
| Plus Additive | | | 0.45 |
| Standard | 0.43 | 0.56 | 0.80 |

Using the above techniques, a variety of compounds and mixtures can be made as will occur to one skilled in the art. For example, the alkanoyl chloride may be a mixture of acid chlorides. The mixtures, for example, may be of normal acids, normal and neo acids and other branched acids to give complex or mixed esters. Many of the mixed acids are commercially available as, for example, under the tradename "Versatic 911, 9, and 1519."

*Example IX*

A quantity, 225.6 g. (3.0 eq. wts.) of the trihydroxydiphenyls and other hydroxyaromatic constituents, i.e., the approximately 40% distillate obtained from resorcinol still bottoms as described in Example I and analyzing 22.6 wt. percent OH was mixed with 1200 ml. toluene and 15 ml. dimethylformamide DMP. The mixture was heated to 70° C. Then neoheptanoyl chloride (148.6, 1.0 eq. wt.) was added over a period of 30 minutes while the reaction mixture was being stirred and the temperature was being maintained at 70–90° C. The reaction mass was maintained at the reflux temperature (about 110° C.) for two hours. When the hydrogen chloride evolution had nearly ceased, the mixture was cooled to 70° C. Then n-hexanoyl chloride (135 g., 1.0 eq. wt.) was added over a period of 30 minutes while the mass was being stirred and the temperature was maintained at 70–90° C. Thereafter, the temperature of the mixture was raised to 100–110° C. and there maintained for about 2 hours, or until no more evolution of hydrogen chloride was evident. After cooling again to 70° C., acetyl chloride (86.4 g., 1.1 eq. wt.) was added to the mass over a period of 30 minutes while stirring the mass and keeping the temperature of the reaction mass at 70–90° C. The temperature was then raised to 100–110° C. and maintained there for 2 hours. After cooling to 35° C., 80 ml. pyridine was added and the mixture then heated to reflux at 110° C. for 2 hours. The mixture was cooled to room temperature and washed in a separatory funnel successively with several portions of 10% hydrochloric acid, 20% sodium hydroxide, and distilled water until the last water wash was neutral to pH indicator paper. Toluene was removed from the reaction mass by vacuum distillation. Then the distillation was continued until the temperature of the residue reached 200° C. at the subatmospheric pressure of 1–2 mm. Hg. Only a few milliliters of distillate were collected during the latter distillation. The acetate-hexanoate-neoheptanoate ester obtained as the residue (454 g., 95% yield) was a dark brown oil containing no free hydroxy groups (by infrared analysis) and had an acid number of less than 0.4 mg. KOH/g. The product had a viscosity at 100° F. of 29 cs., a viscosity at 210° F. of 5.0 cs., an ASTM slope of 0.745, a pour point of −51° F., and a 13,000 cs. temperature of −35° F.

*Example X*

The procedure of Example IX was repeated except that neotridecanoyl chloride (232 g., 1.0 eq. wt.) was substituted for the neoheptanoyl chloride of Example IX, andeicosanoyl chloride (331 g., 1.0 eq. wt.) was substituted for the n-hexanoyl chloride of Example IX.

The resorcinol still residue acetate-neotridecanoate-eicosanoate produced obtained as the residue (682 g., 90% yield) was a dark brown oil containing no free OH groups (by infrared analysis) and having an Acid No. of 0.5 mg. KOH/g. The product had a viscosity at 100° F. of 5100 cs., a viscosity at 210° F. of 61.8 cs., an ASTM slope of 0.80, and a pour point of 45° F.

*Example XI*

The procedure of Example IX was repeated except that the dimethyl formamide was omitted and there was substituted lauroyl chloride (219 g., 1.0 eq. wt.) for the n-heptanoyl chloride of Example IX and n-butanoyl chloride (107 g., 1.0 eq. wt.) for the n-hexanoyl chloride of Example IX.

The acetate-butyrate-laurate ester obtained as the residue (460 g., 88% yield) was a dark amber colored oil containing no free hydroxyl (by infrared analysis) and having an Acid No. of 0.1 mg. KOH/g. It also had a viscosity at 100° F. of 45 cs., a viscosity at 210° F. of 6.57 cs. an ASTM slope of 0.73, a pour point of −43° F., and a 13,000 cs. temperature of −20° F.

*Example XII*

The procedure of Example IX was repeated except that there was substituted 2-ethanylbutanoyl chloride (135 g., 1.0 mole) for the neoheptanoyl chloride of Example IX, 2-ethylhexanoyl chloride (163 g., 1.0 mole) for the n-hexanoyl chloride of Example IX, and n-propionyl chloride (102 g., 1.1 mole) for the acetyl chloride of Example IX.

The propionate - 2 - ethylbutanoate - 2 - ethylhexanoate ester obtained as the residue (380 g., 75% yield) was a red-brown oil containing no free hydroxyl groups (by infrared analysis) and had an Acid No. of 0.3 mg. KOH/g. The product had a viscosity at 100° F. of 138 cs., a viscosity at 210° F. of 10 cs., an ASTM slope of 0.80, a pour point of −20° F., and a 13,000 cs. temperature of +18° F.

*Example XIII*

The procedure of Example IX was repeated except that there was substituted cyclohexanecarbonyl chloride (147 g., 1.0 mole) for the neoheptanoyl chloride of Example IX, neoheptanoyl chloride (149 g., 1.0 mole) for the n-hexanoyl chloride of Example IX, and propionyl chloride (102 g., 1.1 mole) for the acetyl chloride of Example IX.

The propionate-neaheptanoate-cyclohexanecarboxylate product obtained as the residue (428 g., 85% yield) was an amber colored oil containing no free hydroxy groups (by infrared analysis) and having an Acid No. of less than 0.7 mg. KOH/g. The product had a viscosity at 100° F. of 71 cs., a viscosity at 210° F. of 7.3 cs., an ASTM slope of 0.80, a pour point or −42° F., and a 13,000 cs. temperature of −10° F. The propionate-neoheptanoate-cyclohexanecarboxylate of resorcinol still residue had good lubricant properties.

*Example XIV*

A quantity (225.6 g., 3.0 eq. wt.) of the distillate obtained as in Example I from resorcinol still residue was mixed with 15 milliliters of dimethylformamide and 1200 milliliters of toluene. The mixture was heated to 70° C. Then a mixture of lauroyl chloride (219 g., 1.0 mole), n-butanoyl chloride (107 g., 1.0 mole) and acetyl chloride (86.4 g., 1.1 mole) was added over a period of ninety minutes while the temperature was maintained at 70–90° C. The temperature was then raised to reflux temperature (about 110° C.), and the mass was maintained at the reflux temperature for six hours. At this time, the hydrogen chloride evolution had nearly ceased. The reaction mass was cooled to 35° C. and 80 ml. pyridine was added. The reaction mass was reheated to 110° C. and maintained at this temperature for two hours. The reaction mass was cooled to room temperature. The reaction mass was washed with several portions of 10% hydrochloric acid, 20% sodium hydroxide, and distilled water until the water wash was neutral to pH indicator paper. Toluene was removed by distillation. The distillation was continued under vacuum until the residue reached a temperature of 200° C. at the subatmospheric pressure of 1–2 mm. of mercury.

The acetate-butanoate-laurate ester obtained as the residue (485 g., 93% yield) was a brown oil containing no free hydroxyl (by infrared analysis) and having an Acid No. of 0.2 mg. KOH/g. The product has a viscosity at 100° F. of 50 cs., a viscosity at 210° F. of 6.44 cs., an ASTM slope of 0.77, a pour point of −35° F., and a 13,000 cs. temperature of −10° F.

*Example XV*

A quantity (225.6 g., 3.0 eq. wt.), of the distillate obtained as in Example I from resorcinol still residue was mixed with 15 milliliters of dimethyl formamide and 1200 milliliters of toluene. The mixture was heated to 70° C. Then cyclohexanecarbonyl chloride (485 g., 3.3 moles) was added over a period of ninety minutes while the reaction mass was stirred and maintained at 70–90° C. The temperature was raised to reflux and the mass was maintained at the reflux temperature of 110° C. for about six hours. When the hydrogen chloride evolution had nearly ceased, the solution was cooled to 35° C. and pyridine (80 ml.) added. The reaction mixture was again heated to reflux temperature and there maintained for another two hours. After cooling the mass to room temperature, the mass was washed with solutions of 20% hydrochloric acid, 20% sodium hydroxide and with distilled water until the water wash was neutral to pH indicator paper. Toluene was removed by distillation. The distillation was continued under vacuum until the residue reached a temperature of 200° C. at the subatmospheric pressure of 1–2 mm. of mercury.

The tricyclohexanecarboxylate of resorcinol still residue which remained as the residue (445 g., 80% yield) was a brown oil containing no free hydroxy groups (by infrared analysis) and having an Acid No. of 0.3 mg. KOH/g. The product had a viscosity of 100° F. of 510 cs., a viscosity at 210° F. of 19.9 cs., an ASTM slope of 0.80, and a pour point of 20° F.

*Example XVI*

A quantity (89.2 g., 1.19 eq. wt.) of the overhead of resorcinol still residue such as obtained in Example I (22.6% OH, 75.2 eq. wt.), xylene (410 milliliters) and dimethyl formamide (8 milliliters) were charged to a one liter, three-necked flask equipped with a dropping funnel, thermometer, reflux condenser and stirrer. The mixture was heated to 70° C. and mixed acid chlorides of neononanoic acids (obtained by the reaction, following the general procedure of Example I, of thionyl chloride with 2,2-dialkyl alkanoic acids such as sold under the trade name Versatic 9 acids) (1.32 eq. wt.) was then added through the dropping funnel over a period of an hour as the mass was being stirred and maintained at a temperature of 70–90° C. Then the reaction mass was maintained at a temperature of 90–121° C. for five hours. The mass was cooled to room temperature and pyridine (80 milliliters) added. The reaction mass was again heated to 100–120° C. and there maintained for two hours. The mass was then cooled to room temperature.

The reaction mass was washed successively with dilute aqueous hydrochloric acid, dilute aqueous sodium hydroxide, and with distilled water until the wash water gave a neutral indication to pH indicator paper. The xylene was removed by distillation and the distillation continued under vacuum until a residue temperature of 200° C. at the subatmospheric pressure of 1–3 mm. of mercury was reached.

Infrared analysis and a hydroxyl determination by acetylation showed the product to be a mixture of esters of neononanoic acids and trihydroxydiphenyl. The product had a viscosity of 5200 cs. at 100° F.

*Example XVII*

The procedure of Example XVI was repeated except that mixed acid chlorides obtained from commercial C9, C10, C11 acids sold under the tradename Versatic 911 were used. The product was a mixture of esters of these acids and resorcinol still residue.

*Example XVIII*

The procedure of Example XVI was repeated except that mixed acid chlorides that were obtained from C15, C19 acids sold under the tradename Versatic 1519 were used. The product was a complex mixture of esters of these acids and resorcinol still residue.

*Example XIX*

Crude resorcinol still residue was subjected to distillation using a Rodney-Hunt Turbo-Film evaporator (feed rate 150 pounds/hour, oil temperature 300–320° C., pressure 1–2 mm. mercury) until 40% by weight had been removed as overhead.

A 1 kg. quantity of this overhead analyzing 22.6% OH, was dissolved in 2 liters of 5% NaOH solution, the resulting solution cooled to 10° C., and then during 1.5 hours treated with 274 g. concentrated hydrochloric acid while keeping the temperature at 10–12° C. The mixture was stirred at 10–15° C. until solid balls formed, then was refrigerated (5° C.) overnight. The solid mass was filtered off, sucked dry on a vacuum filter, washed with two 100-ml. portions of ice-cold water, and again sucked dry on the vacuum filter. This solid was then dried at 65° C. in a vacuum oven to yield 213 g., M.P. 115–143° C. The crude product (213 g.) was recrystallized from 3200 ml. hot water by allowing the hot solution to cool to room temperature overnight. The recrystallized product was dried, isolated by filtration, slurried in 375 ml. water, filtered, washed with two 100 ml. portions of water, redissolved in 1660 ml. water at 90° C. and the solution clarified with 6 grams each of "Nuchar" activated carbon and "Celite" filter aid. The pH of the solution then was adjusted from 4.0 to 6.1 by addition of dilute sodium hydroxide solution. The solution was warmed to dissolve some precipitated solid and then let cool to room temperature overnight. (The crystals which formed overnight were separated by filtration, redissolved in 850 ml. boiling water, cooled to 40° C. and filtered to remove precipitated 3,4'-dihydroxydiphenyl, 19.0 g., M.P. 197–198° C.). The combined filtrates from the above clarifications and 3,4'-dihydroxydiphenyl isolation operations were concentrated by boiling off water to one-third the original volume. The solution was chilled, the solids filtered, and the solids finally dried in a vacuum oven at 65° C. to yield 55 grams of white crystals, M.P. 136–136.5° C. By quantitative vapor phase chromatography the product was analyzed as being 98.5% 2,3',4-trihydroxydiphenyl. The OH content was 24.2% (25.2 theoretical).

The product was esterified following the procedure of Example III to yield the trineoheptanoate of 2,3',4-trihydroxydiphenyl.

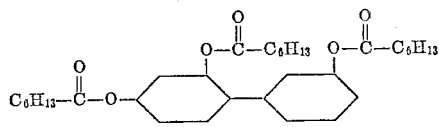

I claim:
1. A compound of the formula

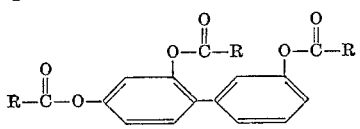

R may be the same or different hydrocarbon groups selected from the group consisting of alkyl groups having from 1–20 carbon atoms and cyclohexyl.

2. 2,3',4-trihydroxydiphenyl tripivalate.
3. 2,3',4-trihydroxydiphenyl trineoheptanoate.
4. 2,3',4-trihydroxydiphenyl trineatridecanoate.
5. The monopivalate-dineoheptanoate of 2,3',4-trihydroxydiphenyl.
6. 2,3',4-trihydroxydiphenyl triheptanoate.
7. Dineoheptanoate of 2,3',4-trihydroxydiphenyl.
8. 2,3',4 - trihydroxydiphenyl acetate-neoheptanoate-hexanoate.
9. The acetate-neotridecanoate-eicosanoate of 2,3',4-trihydroxydiphenyl.
10. 2,3',4-trihydroxydiphenyl acetate-butyrate-laurate.
11. 2,3',4 - trihydroxydiphenyl propionate - 2- ethyl-butanoate-2-ethylhexanoate.
12. 2,3',4 - trihydroxydiphenyl propionate-neoheptanoatecyclohexanecarboxylate.
13. 2,3',4-trihydroxydiphenyl acetate-butanoate-laurate.
14. Tricyclohexanecarboxylate of 2,3',4-trihydroxydiphenyl.
15. Trineoheptanoate of 2,3',4-trihydroxydiphenyl.

References Cited

Fieser: J. Amer. Chem. Soc., vol. 70 (1948), page 3173.

HENRY R. JILES, *Primary Examiner.*